(12) United States Patent
Pabijanskas et al.

(10) Patent No.: US 12,074,798 B2
(45) Date of Patent: *Aug. 27, 2024

(54) REASSIGNING EXIT INTERNET PROTOCOL ADDRESSES IN A VIRTUAL PRIVATE NETWORK SERVER

(71) Applicant: UAB 360 IT, Vilnius (LT)

(72) Inventors: Karolis Pabijanskas, Vilnius (LT); Kiril Mikulskij, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,097

(22) Filed: Jun. 29, 2023

(65) Prior Publication Data
US 2023/0353494 A1 Nov. 2, 2023

Related U.S. Application Data

(60) Continuation of application No. 17/824,987, filed on May 26, 2022, now Pat. No. 11,736,401, which is a
(Continued)

(51) Int. Cl.
| | |
|---|---|
| *H04L 29/08* | (2006.01) |
| *H04L 12/46* | (2006.01) |
| *H04L 29/06* | (2006.01) |
| *H04L 47/11* | (2022.01) |
| *H04L 47/125* | (2022.01) |
| *H04L 61/50* | (2022.01) |
| *H04L 61/5007* | (2022.01) |

(Continued)

(52) U.S. Cl.
CPC .......... *H04L 47/11* (2013.01); *H04L 12/4641* (2013.01); *H04L 47/125* (2013.01); *H04L 61/50* (2022.05); *H04L 61/5007* (2022.05); *H04L 61/5061* (2022.05); *H04L 61/5084* (2022.05); *H04L 67/02* (2013.01); *H04L 67/55* (2022.05)

(58) Field of Classification Search
CPC ... H04L 47/11; H04L 47/125; H04L 61/5007; H04L 61/5061; H04L 61/50; H04L 61/5084; H04L 67/55; H04L 67/02; H04L 12/4641
USPC ......................................................... 709/223
See application file for complete search history.

(56) References Cited

U.S. PATENT DOCUMENTS 9,794,281 B1 10/2017 Radlein et al.
10,257,167 B1 * 4/2019 Matthews ........... H04L 12/4641
(Continued)

FOREIGN PATENT DOCUMENTS

CN 101309305 A * 11/2008
CN 101969480 A * 2/2011

*Primary Examiner* — Ruolei Zong
(74) *Attorney, Agent, or Firm* — The Pattani Law Group

(57) ABSTRACT

A method including assigning, by a virtual private network (VPN) server, a first exit internet protocol (IP) address to communicate data associated with a user device having an established VPN connection with the VPN server; determining, by the VPN server, occurrence of a network event associated with the first exit IP address; and assigning, by the VPN server based at least in part on determining occurrence of the network event, a second exit IP address to communicate the data associated with the user device during the established VPN connection, the second exit IP address being different from the first exit IP address is disclosed. Various other aspects are contemplated.

20 Claims, 7 Drawing Sheets

Related U.S. Application Data continuation of application No. 17/384,794, filed on Jul. 25, 2021, now Pat. No. 11,368,428, which is a division of application No. 17/384,749, filed on Jul. 24, 2021, now Pat. No. 11,362,990.

(51) Int. Cl.
  *H04L 61/5061* (2022.01)
  *H04L 61/5084* (2022.01)
  *H04L 67/02* (2022.01)
  *H04L 67/55* (2022.01)

(56) References Cited

U.S. PATENT DOCUMENTS

| | | | |
|---|---|---|---|
| 10,601,779 B1* | 3/2020 | Matthews | H04L 67/141 |
| 10,645,056 B2* | 5/2020 | Petersen | H04L 61/103 |
| 2005/0246711 A1 | 11/2005 | Berstis et al. | |
| 2010/0315943 A1 | 12/2010 | Chao et al. | |
| 2013/0104228 A1* | 4/2013 | Burnham | H04L 63/1491 |
| | | | 726/22 |
| 2015/0138952 A1 | 5/2015 | Tamura et al. | |
| 2017/0099159 A1* | 4/2017 | Abraham | H04L 45/54 |
| 2017/0111859 A1* | 4/2017 | Sakai | H04W 52/0212 |
| 2018/0109553 A1 | 4/2018 | Radlein et al. | |
| 2019/0081930 A1* | 3/2019 | Hunt, IV | H04L 12/4641 |
| 2019/0268171 A1* | 8/2019 | Hill | H04L 12/1435 |
| 2019/0373526 A1* | 12/2019 | Chow | H04W 36/14 |
| 2020/0067877 A1* | 2/2020 | Hoy | H04L 63/102 |
| 2020/0136862 A1* | 4/2020 | Jain | H04L 12/4633 |

* cited by examiner

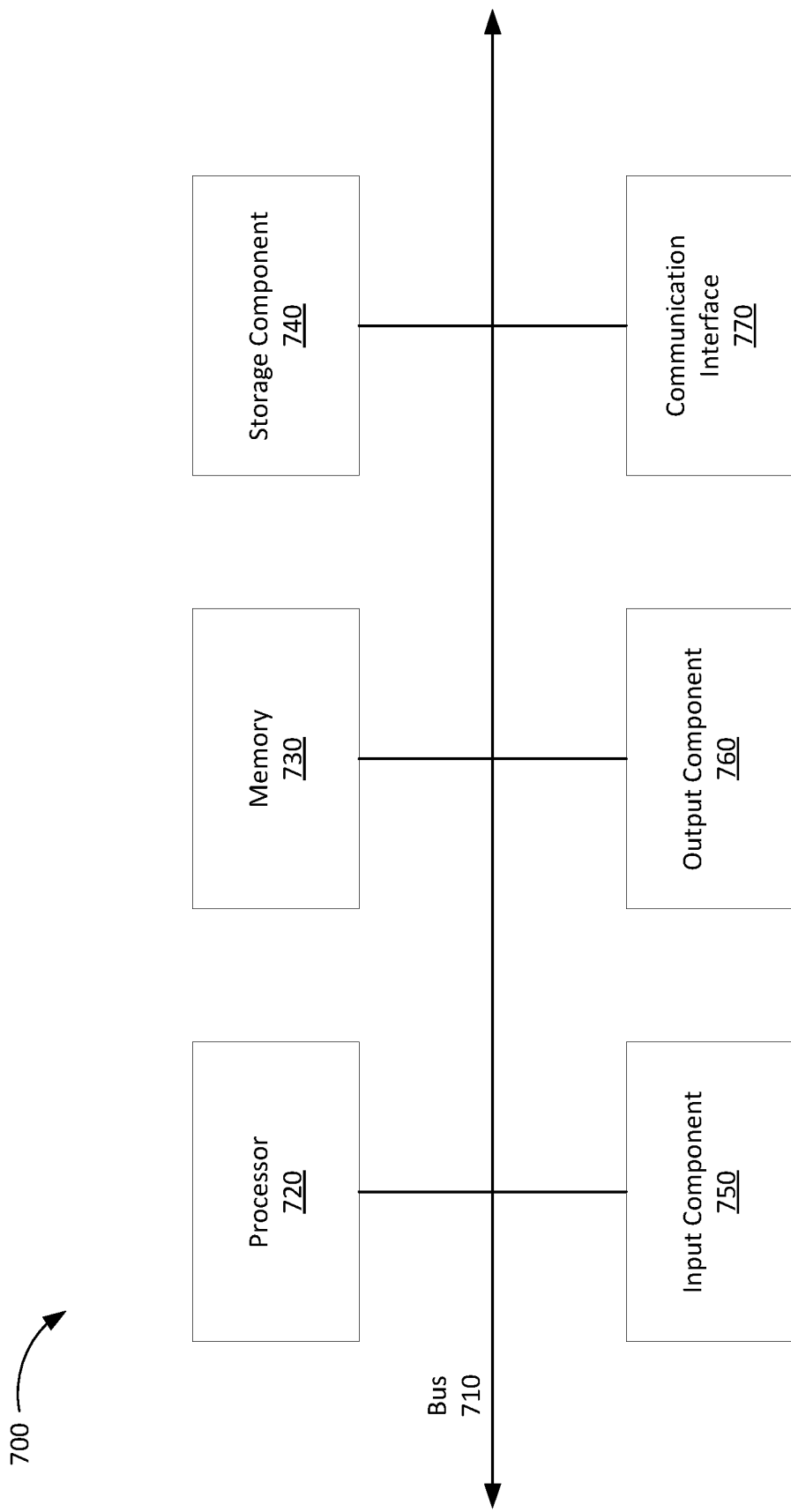

REASSIGNING EXIT INTERNET PROTOCOL ADDRESSES IN A VIRTUAL PRIVATE NETWORK SERVER

CROSS REFERENCE

This application is a continuation application of U.S. Non-Provisional patent application Ser. No. 17/824,987, filed on May 26, 2022, which claims priority to U.S. Non-Provisional patent application Ser. No. 17/384,794, filed on Jul. 25, 2021, which, in turn, which is a divisional of U.S. Non-Provisional patent application Ser. No. 17/384,749, filed on Jul. 24, 2021, the entire contents of which applications are incorporated herein by reference.

FIELD OF DISCLOSURE

Aspects of the present disclosure generally relate to a virtual private network (VPN), and more particularly to reassigning exit internet protocol (IP) addresses in a VPN server.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for reassigning exit internet protocol (IP) addresses in a virtual private network (VPN), the method comprising selecting a first exit IP address for communicating data associated with a user device having an established VPN connection; receiving a notification that indicates occurrence of a network event associated with the first exit IP address; and communicating, during the established VPN connection, data associated with the user device using a second exit IP address, different from the first exit IP address.

In another aspect, the present disclosure contemplates a device associated with a virtual private network (VPN), the device comprising a memory; and a processor communicatively coupled to the memory, the memory and processor being configured to: select a first exit IP address for communicating data associated with a user device having an established VPN connection; receive a notification that indicates occurrence of a network event associated with the first exit IP address; and communicate, during the established VPN connection, data associated with the user device using a second exit IP address, different from the first exit IP address.

In another aspect, the present disclosure contemplates a non-transitory computer readable medium storing instructions, which when executed by a processor cause the processor to: select a first exit IP address for communicating data associated with a user device having an established VPN connection; receive a notification that indicates occurrence of a network event associated with the first exit IP address; and communicate, during the established VPN connection, data associated with the user device using a second exit IP address, different from the first exit IP address.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
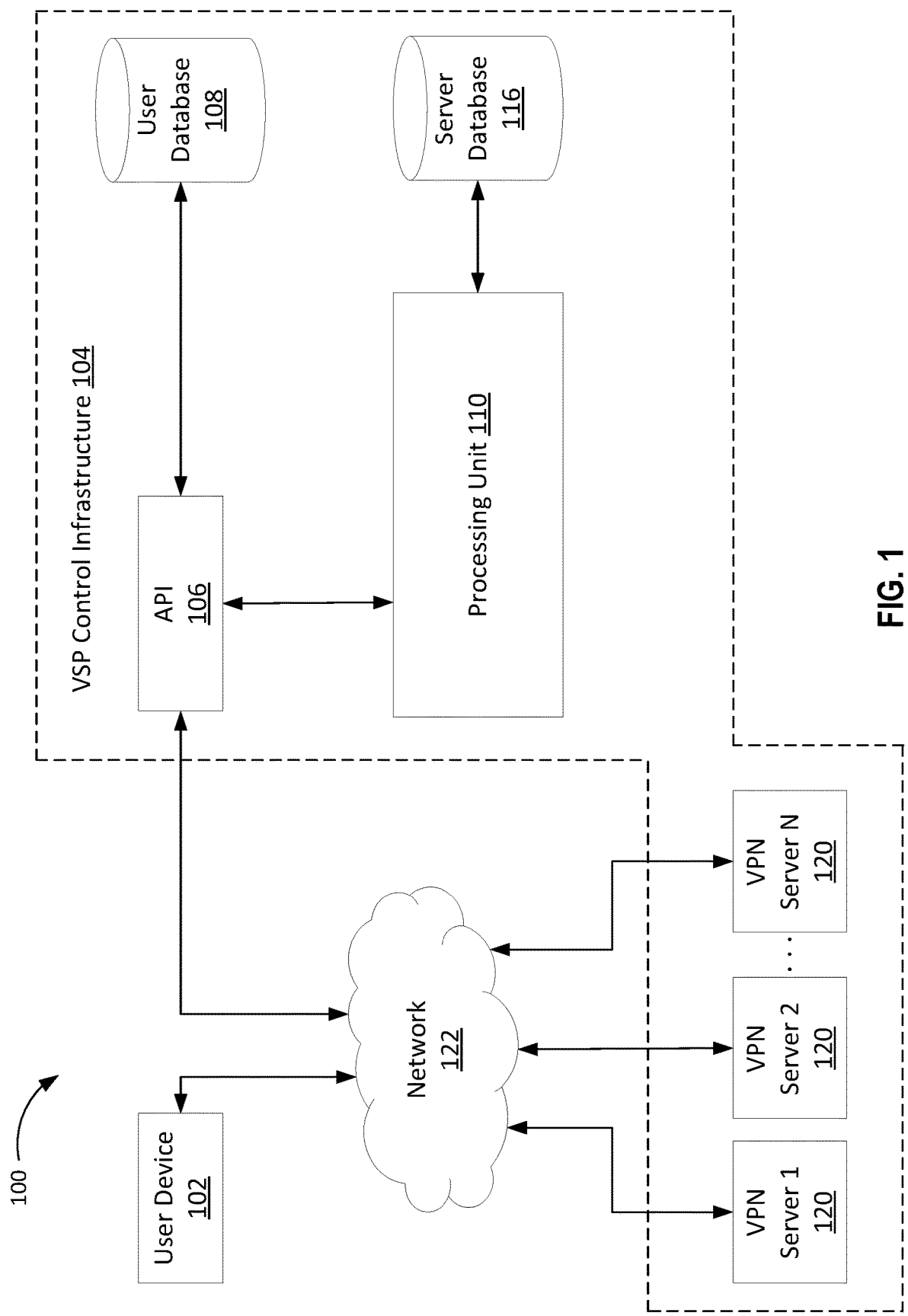

FIG. 1 is an illustration of an example system associated with reassigning of exit IP addresses in a VPN server, according to various aspects of the present disclosure.

Figure 2:
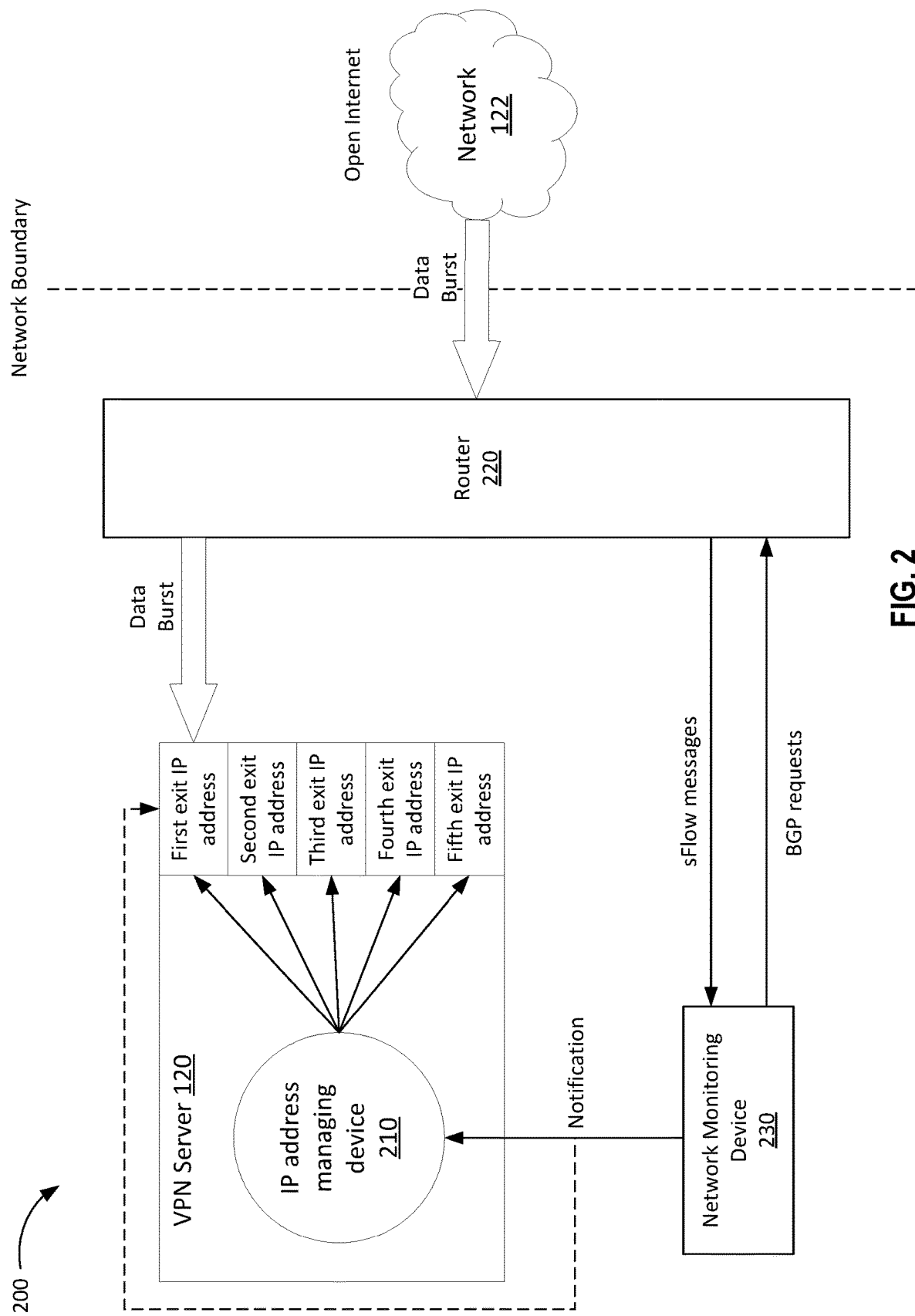

FIG. 2 is an illustration of an example system associated with reassigning of exit IP addresses in a VPN server, according to various aspects of the present disclosure.

Figure 3:
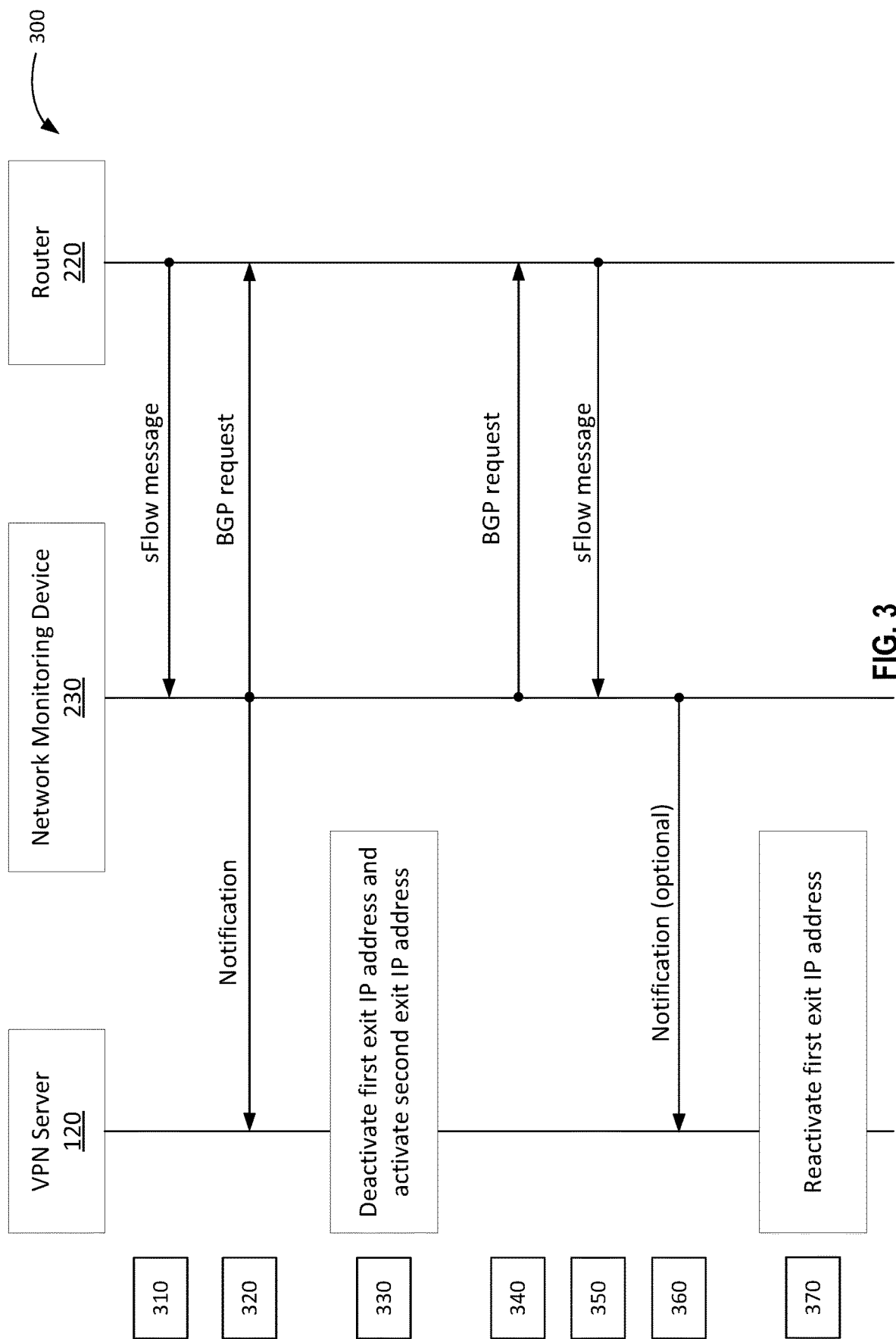

FIG. 3 is an illustration of an example flow associated with reassigning of exit IP addresses in a VPN server, according to various aspects of the present disclosure.

Figure 4:
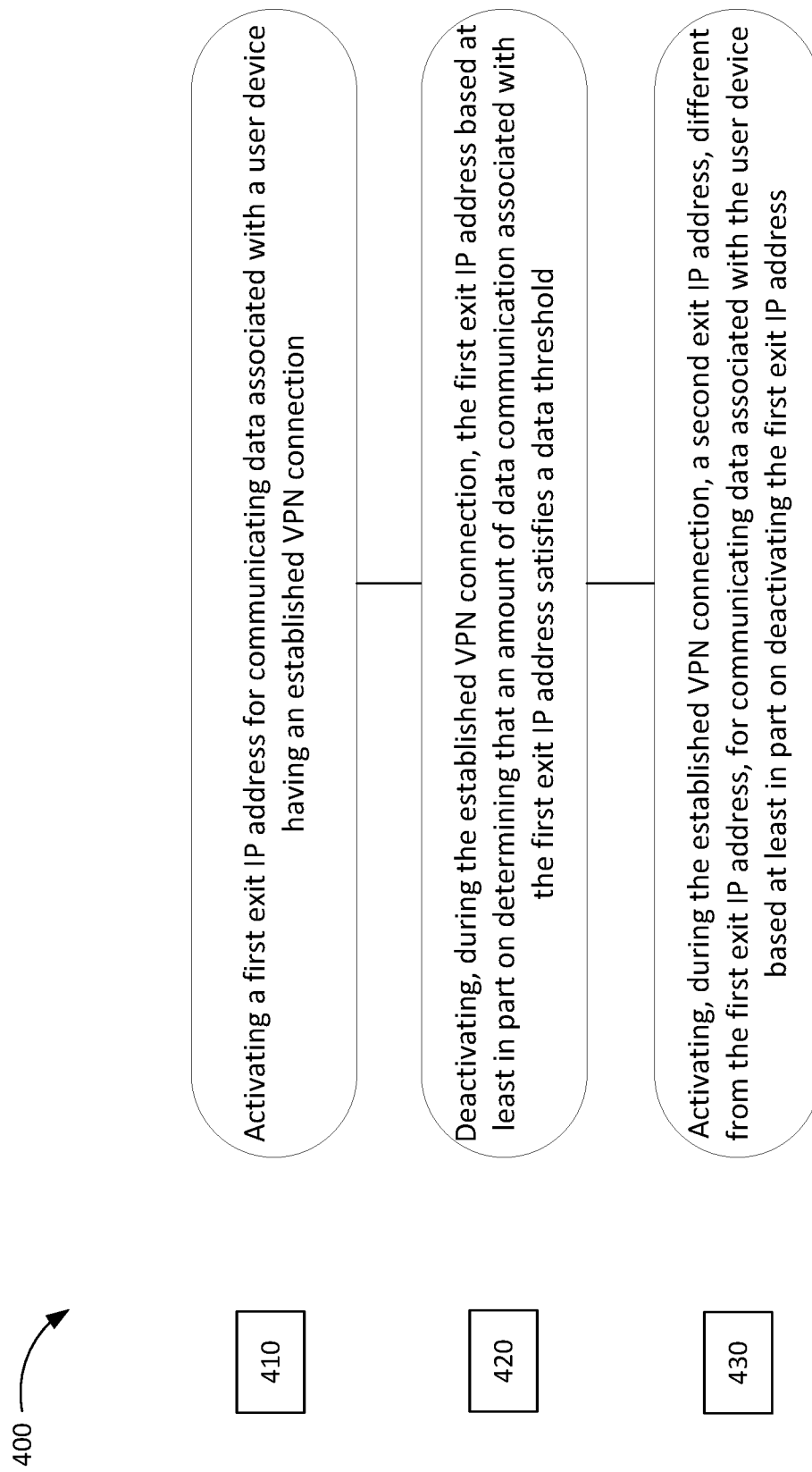

FIG. 4 is an illustration of an example process associated with reassigning of exit IP addresses in a VPN server, according to various aspects of the present disclosure.

Figure 5:
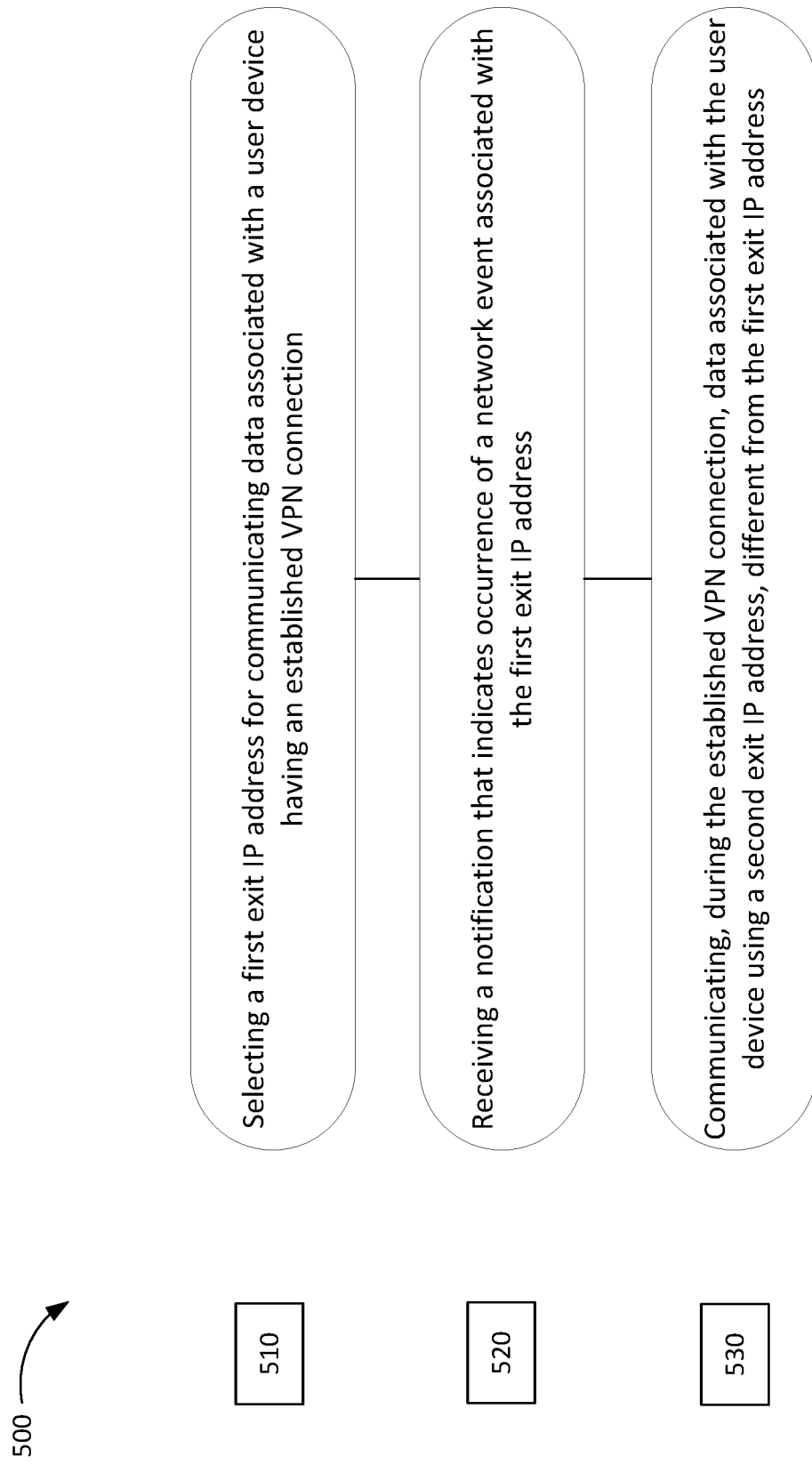

FIG. 5 is an illustration of an example process associated with reassigning of exit IP addresses in a VPN server, according to various aspects of the present disclosure.

Figure 6:
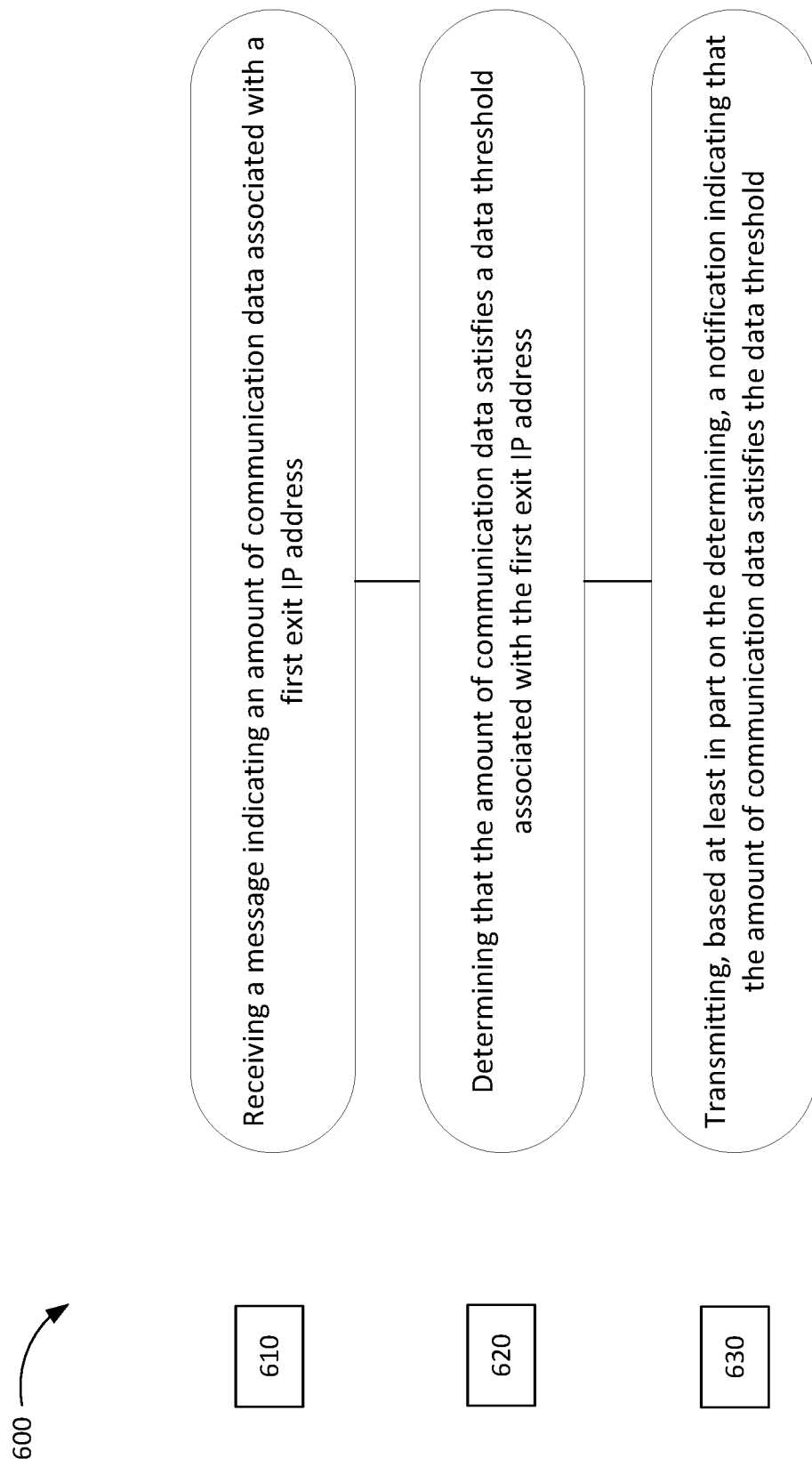

FIG. 6 is an illustration of an example process associated with reassigning of exit IP addresses in a VPN server, according to various aspects of the present disclosure.

FIG. 7 is an illustration of example devices associated with reassigning of exit IP addresses in a VPN server, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with rotating exit IP addresses in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 may a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, or a combination thereof. For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, one or more components shown in FIG. 1 may be configured to perform one or more functions described as being performed by another set of components shown in FIG. 1.

As indicated above, FIG. 1 is provided as an example. Other examples may differ from what is described with regard to FIG. 1.

One or more user devices may establish respective VPN connections (e.g., encrypted tunnels) with a VPN server. Based at least in part on establishing the respective VPN connections, the VPN server and/or a VSP control infrastructure, responsible for managing the primary VPN server, may assign an exit IP address to the one or more user devices. During the established respective VPN connections (e.g., while the respective VPN connections remain established), the VPN server may use the exit IP address for communication of data associated with the one or more user devices. For instance, during the established respective VPN connections, the VPN server may use the exit IP address to receive and provide data of interest, requested by the one or more user devices, from the open internet.

The exit IP address may be configured to communicate a threshold amount of data (e.g., data threshold). When the data communication using the exit IP address reaches an amount of data that satisfies the data threshold (e.g., amount of communicated data is larger than the data threshold), the VPN server may have to stop using the exit IP address to communicate data. In one example, a party on the open internet may transmit a burst of data to the exit IP address (e.g., burst attack), thereby enabling the data communication using the exit IP address to reach the amount of data that satisfies the data threshold. In this case, the exit IP address may become overloaded, resulting in reduced bandwidth being available for data communication associated with the one or more user devices. As a consequence, the one or more user devices may receive degraded service from the VPN server. To avoid providing degraded service, the VPN server may have to stop using the exit IP address for data communication and, thereby, terminate the established respective VPN connections. As a result, provision of VPN services to the one or more user devices may be interrupted and the one or more users may be required to reestablish the respective VPN connections. Terminating the established respective VPN connections and requiring the one or more users to reestablish the respective VPN connections consumes resources associated with the VPN (e.g., computational resources, management resources, processing power, memory utilization, network bandwidth, etc.) and user device resources (e.g., processing power, memory utilization, power consumption, battery life, etc.) that may otherwise be used for performing preferred tasks related to the respective VPN connections.

Various aspects of systems and techniques discussed in the present disclosure enable reassigning exit IP addresses in a VPN server. In some aspects, a VPN server is enabled to reassign exit IP addresses by assigning a different exit IP address (e.g., second exit IP address) to one or more user devices having established respective VPN connections with the VPN server when a previously assigned exit IP address (e.g., first exit IP address) to the one or more user devices becomes overloaded. Using the second exit IP address for data communication may enable the VPN server to provide uninterrupted communication (e.g., reception and/or transmission) of data associated with the one or more user devices. In this way, the VPN server may reallocate one or more user devices to another exit IP address. As a result, the VPN server may avoid providing degraded service to the one or more user devices and may avoid having to terminate the established respective VPN connections. Additionally, resources associated with the VPN (e.g., computational resources, management resources, processing power, memory utilization, network bandwidth, etc.) and user device resources (e.g., processing power, memory utilization, power consumption, battery life, etc.) may be available for performing preferred tasks related to the respective VPN connections.

In some aspects, the VPN server may activate the first exit IP address for communicating data associated with a user device having an established VPN connection. In some aspects, activating the first exit IP address may include selecting and/or assigning the first exit IP address, from among a plurality of exit IP addresses included in a pool of exit IP addresses available to the VPN server, for communication of data (e.g., data communication) associated with the user device. The VPN server may deactivate, during the established VPN connection, the first exit IP address based at least in part on determining that an amount of data communication associated with the first exit IP address satisfies a data threshold. In some aspects, deactivating the first exit IP address may include suspending, for a given duration of time, the use of the first exit IP address for communication of data associated with the user device. In some aspects, deactivating the first exit IP address may include refraining from using, for the given duration of time, the first exit IP address for communication of data associated with the user device. The VPN server may activate, during the established VPN connection, a second exit IP address, different from the first exit IP address, for communicating data associated with the user device based at least in part on deactivating the first exit IP address. In some aspects, activating the second exit IP address may include selecting and/or assigning the second exit IP address, from among the plurality of exit IP addresses included in the pool of exit IP addresses available to the VPN server, for communication of data associated with the user device. The VPN server may reactivate the first exit IP address based at least in part on determining that the amount of data communication associated with the first exit IP address fails to satisfy the data threshold (e.g., amount of data communication is equal to or less than (e.g., below) the data threshold).

FIG. 2 is an illustration of an example system 200 associated with reassigning of exit IP addresses in a VPN server, according to various aspects of the present disclosure. The example system 200 may represent an instance associated with a server location and may include a VPN server 120, a router 220, and a network monitoring device 230 on an internal side (e.g., VPN side) of a network boundary. Although a single VPN server 120 has been shown in FIG. 2, the present disclosure contemplates the example system 200 include any number of VPN servers 120. The VPN server 120 may be in communication with a user device 102 (not shown) having an established VPN connection with the VPN server 120. The VPN server 120 may receive, for example, communication data associated with the user device 102 from a host device (not shown) on an external side (e.g., the open internet side) of the network boundary. To receive the communication data, the VPN server 120 may be associated with a plurality of exit IP addresses including, for example, a first exit IP address, a second exit IP address, a third exit IP address, a fourth exit IP address, and a fifth exit IP address. Each of the exit IP addresses may be from among a plurality of exit IP addresses included in a pool of exit IP addresses available to the VPN server 120. Although five exit IP addresses have been shown in FIG. 2, the present disclosure contemplates any number of exit IP addresses to be available to the VPN server 120. In some aspects, the exit IP addresses may be IPv4 IP address, IPv6 IP addresses, or the like.

In some aspects, the VPN server 120 may randomly select or sequentially select an exit IP address from among the plurality of exit IP addresses included in the pool of exit IP addresses. Randomly selecting or sequentially selecting an exit IP address may include selecting an exit IP address according to, for example, an inverse sequential order, a random sequential (random but higher) order, a random inverse (random but lower) order, a random non-sequential (random but not next) order, a two-step (random and then next) order, a random including current exit IP address order, a sequential discreet (at least n+2 steps, with n being an integer), and/or a random lower bound (random but only within a upper half, upper quartile, etc.) order. In some aspects, sequentially selecting the exit IP address may include selecting a next exit IP address from a predefined list of exit IP addresses.

In some aspects, the VPN server 120 may include the network monitoring device 230. In some aspects, the VPN server 120 and the network monitoring device 230 may be co-located (e.g., share a location).

The VPN server 120 may include an IP address managing device 210 for selecting and/or assigning an exit IP address, from among the plurality of exit IP addresses, to communicate data associated with the user device 102. In some aspects, the IP address managing device 210 may activate, for example, the first exit IP address by selecting and/or assigning the first exit IP address to communicate data associated with the user device 102. To activate the first exit IP address, the VPN server 120 may use an internal firewall (e.g., nftable) to update source network address translation (SNAT) rules such that the first exit IP is used for communicating data and/or set an internal connection tracking table to select and/or assign the first exit IP address for being used for communicating data associated with the user device 102 (and/or any other user device).

The router 220 may be responsible for communication of data across the network boundary. The router 220 may be configured to monitor and record data traffic, including an amount of data communicated (e.g., transmitted and/or received), associated with the VPN server 120. The router 220 may also be configured to retrieve and/or receive data from the VPN server 120 (e.g., in case of absence of other means to retrieve and/or receive the data). In some aspects, the router 220 may function as a switch and be responsible for routing data received from an appropriate exit IP address of the VPN server 120 to, for example, the host device on the open internet and for routing data received from the host device on the open internet to the appropriate exit IP address of the VPN server 120. The network monitoring device 230 may be configured to monitor an amount of data communicated to one or more exit IP addresses. In some aspects, the network monitoring device 230 may receive sampled data from the router 220, the sampled data indicating an amount of data transferred by, or to be transferred by, the router 220 to the one or more exit IP address. In some aspects, the sampled data may be transmitted and/or received via an sFlow protocol, a Netflow protocol, an IPFIX protocol, a Tera flow protocol, port mirroring, or any other mechanism able to communicate sampled data. In one example, the network monitoring device 230 may receive a sampled data from the router 220, the sampled data indicating an amount of data routed by the router 220 to the first exit IP address.

The network monitoring device 230 may also be configured to compare the indicated amount of data with a data threshold associated with the first exit IP address. In some aspects, the data threshold may be associated with a maximum amount of data that the first exit IP address (or any other exit IP address) may be configured to receive in a communication. In some aspects, the data threshold may be associated with a predetermined amount of data that the first exit IP address (or any other exit IP address) may be configured to receive in a communication and/or within a given time duration. In some aspects, the data threshold may be preset/predetermined and/or dynamically set during operation of the VPN server 120. In some aspects, the VPN server 120 may evaluate factors such as, for example, a total amount of traffic associated with the first exit IP address, an amount of load on a processor associated with the VPN server 120 based on traffic via the first exit IP address, an amount of user devices associated with the first exit IP address, or the like to preset/predetermine and/or dynamically set the data threshold. For instance, during operation, the VPN server 120 may compare (e.g., continuously or at periodic intervals) the total amount of traffic to a limit amount of traffic that the first exit IP address is configured to handle, the VPN server 120 may reduce the data threshold before, for example, the first exit IP address becomes saturated.

During the established VPN connection, the VPN server 120 may receive communication data using the first exit IP address at, for example, a first port associated with the first exit IP address. In an instance, the communication data may include a data burst to be routed to the first exit IP address, the data burst being transmitted by a host device (or any other source) on the open internet. The data burst may include a burst amount of data that satisfies the data threshold (e.g., the burst amount of data is larger than the data threshold). For instance, the burst amount of data may include an amount of data larger than the predetermined amount of data that the first exit IP address (or any other exit IP address) is configured to receive in a communication and/or within a given time duration. Based at least in part on receiving the data burst, the switch 220 may sample the burst amount of data and transmit the sampled burst amount of data to the network monitoring device 230.

Based at least in part on receiving the sampled burst amount of data, the network monitoring device 230 may compare the sampled burst amount of data with the data threshold associated with the first exit IP address. Based at least in part on the comparison, the network monitoring device 230 may determine that the sample burst amount of data satisfies the data threshold (e.g., the sample burst amount of data is larger than the data threshold) associated with the first exit IP address. Based at least in part on such a determination, the network monitoring device 230 may transmit a route update request associated with the first exit IP address to the router 220 via a border gateway protocol (BGP) request. In some aspects, the route update request may indicate to internet service providers (ISPs) on the VPN side and the open internet side to null-route data to be transmitted to the first exit IP address (e.g., suspend transmitting data to the first exit IP address). In some aspects, the network monitoring device 230 may route the route update request (e.g., BGP request) to the ISPs via the router 220. In some aspects, the router 220 may be configured to null-route the first exit IP address when there is enough bandwidth on the VPN side to process the sampled burst amount of data. For instance, based at least in part on receiving the route update request from the network monitoring device, the router 220 may drop communication data associated with the first exit IP address. In this way, the route update request may not have to be routed to the ISPs.

Additionally, or alternatively, the network monitoring device 230 may substantially simultaneously transmit, and the VPN server 120 may receive, a notification indicating that the data burst, which satisfies the data threshold associated with the first exit IP address has been received (e.g., network event) to be routed, or has been routed, to the first exit IP address and/or that the first exit IP address has been null-routed. The notification may indicate to the VPN server 120 that data communication associated with the first exit IP address is to be suspended. In some aspects, the network monitoring device 230 may transmit, and the VPN server 120 may receive, the notification at the IP address managing device 210. In some aspects, the network monitoring device 230 may transmit, and the VPN server 120 may receive, the notification at the port associated with the first exit IP address. In some aspects, the network monitoring device 230 may utilize an anti-distributed denial of service (anti-DDoS) protocol and/or process to transmit the notification to the VPN server 120. In some aspects, the network monitoring device 230 may transmit the notification using a hypertext transfer protocol (HTTP), a hypertext transfer protocol secure (HTTPS), a quick user datagram protocol (UDP) Internet Connection (QUIC) protocol, a simple network management protocol (SNMP), or another suitable protocol.

Based at least in part on receiving the notification from the network monitoring device 230, the VPN server 120 may determine that the data burst satisfying the data threshold associated with the first exit IP address has been received and/or that the first exit IP address has been null routed, and that data communication associated with the first exit IP address is to be suspended. The VPN server 120 may deactivate, during the established VPN connection, the first exit IP address based at least in part on such a determination. In some aspects, deactivating the first exit IP address may include suspending, for a given duration of time, the use of the first exit IP address for communication of data. In some aspects, deactivating the first exit IP address may include refraining from using, for the given duration of time, the first exit IP address for communication of data. To deactivate the first exit IP address, the VPN server 120 may use the internal firewall to update the SNAT rules such that the first exit IP is no longer used for communicating data, and/or clear the internal connection tracking table to unselect and/or unassign the first exit IP address from being used for communicating data associated with the user device 102 (and/or any other user device).

Based at least in part on deactivating the first exit IP address, during the established VPN connection, the VPN server 120 may activate the second exit IP address for communicating data associated with the user device 102. In some aspects, activating the second exit IP address may include selecting and/or assigning the second exit IP address, from among the plurality of exit IP addresses included in the pool of exit IP addresses available to the VPN server, for communication of data associated with the user device 102. To activate the second exit IP address, the VPN server 120 may use the internal firewall to update the SNAT rules such that the second exit IP is used for communicating data, and/or set the internal connection tracking table to select and/or assign the second exit IP address for being used for communicating data associated with the user device 102 (and/or any other user device). In some aspects, reassigning exit IP addresses may include deactivating the first exit IP address and/or activating the second exit IP address during the established VPN connection for communicating data associated with the user device 102.

In some aspects, the null-routing of data may be temporary. For instance, based at least in part on transmitting the BGP request, the network monitoring device 230 may start running a null timer for a given duration of time (e.g., 30 seconds, 60 seconds, 90 seconds, 120 seconds, 300 seconds, or the like). Based at least in part on an expiration of the null timer, the network monitoring device 230 may transmit another BGP request to the ISPs to end the null-routing of the data to be transmitted to the first exit IP address. Based at least in part on ending of the null-routing, the router 220 may receive, from the ISPs, communication data associated with the first exit IP address, and may transmit sampled data indicating an amount of data received for routing to the first exit IP address.

The network monitoring device 230 may compare the indicated amount of data with the data threshold associated with the first exit IP address, and determine whether the indicated amount of data satisfies the data threshold. When the indicated amount of data satisfies the data threshold, the network monitoring device may transmit a BGP request to the ISPs to again null-route the data to be transmitted to the first exit IP address. During this processing by the network monitoring device 230, the VPN server 120 may continue to keep the first exit IP address deactivated. On the other hand, when the indicated amount of data fails to satisfy the data threshold (e.g., indicated amount of data is equal to or less than the data threshold), the network monitoring device 230 may transmit, and the VPN server 120 may receive, another notification indicating that the communication data, which fails to satisfy the data threshold has been received (e.g., network event) to be routed to the first exit IP address and/or that the null-routing of the first exit IP address has ended. Based at least in part on receiving such a notification, the VPN server 120 may reactivate the first exit IP address, as discussed above with respect to FIG. 2.

In some aspects, based at least in part on receiving (e.g., a time of receipt of) the notification that the communication data, which fails to satisfy the data threshold has been received to be routed to the first exit IP address and/or that the null-routing of the first exit IP address has ended, the VPN server 120 may continue to use the second exit IP address for data communication associated with data requests received from the user device 102 prior to the reactivation of the first exit IP address and may use the reactivated first exit IP address for data communication associated with requests received after reactivation of the first exit IP address. In such situations, the VPN server 120 may simultaneously use the first exit IP address and the second exit IP address to communicate data associated with user device 102. To do so, the VPN server 120 may use the internal firewall to update source network address translation (SNAT) rules such that the first exit IP and/or the second exit IP address are used for communicating data, and/or set the internal connection tracking table to select and/or assign the first exit IP address and/or the second exit IP address for being used for communicating data associated with the user device 102 (and/or any other user device). In some aspects, based at least in part on determining that a data request (or all data requests) received prior to reactivation of the first exit IP address has been fulfilled, the VPN server 120 may use the internal firewall to update the SNAT rules such that the first exit IP and/or the second exit IP address are used for communicating data, but set the internal connection tracking table to select and/or assign only the first exit IP address for being used for communicating data associated with the user device 102 (and/or any other user device). In this way, the second exit IP address may be made available to communicate data associated with other user devices. In some aspects, the second exit IP address may be unselected from being used to communicated data associated with the user device based at least in part on reactivating the first exit IP address.

In some aspects, the VPN server 120 may start running an activation timer, internal to the VPN sever 120, based at least in part on receiving the notification indicating that the communication data associated with the first exit IP address fails to satisfy the data threshold from the network monitoring device 230. The start running of the activation timer may be at a substantially similar time as the start running of the null timer. The activation timer may run for a duration of time (e.g., 60 seconds, 120 seconds, 180 seconds, 240 seconds, 600 seconds, or the like) greater than the duration of time of the null timer. After receiving the notification indicating that the communication data associated with the first exit IP address fails to satisfy the data threshold, the VPN server 120 may wait until an expiration of the activation timer to reactivate the first exit IP address.

In this way, by deactivating, during the established VPN connection, the first exit IP address based at least in part on determining that the amount of data communication associated with the first exit IP address satisfies the data threshold, and activating, during the established VPN connection, the second exit IP address for communicating data associated with the user device based at least in part on deactivating the first exit IP address, enables the VPN server 120 to provide uninterrupted communication of data associated with one or more user devices. As a result, the VPN server may avoid providing degraded service to the one or more user devices and may avoid having to terminate established respective VPN connections. Additionally, VPN resources (e.g., processing power, memory utilization, network bandwidth, etc.) and user device resources (e.g., processing power, memory utilization, power consumption, battery life, etc.) may be available for performing suitable tasks related to the respective VPN connections.

As indicated above, FIG. 2 is provided as an example. Other examples may differ from what is described with regard to FIG. 2.

FIG. 3 is an illustration of an example flow 300 associated with reassigning exit IP addresses in a VPN, according to various aspects of the present disclosure. Example flow 300 includes a VPN server 120, a router 220, and a network monitoring device 230 in communication with each other. In some aspects, a user device 102 (not shown) may have an established VPN connection with the VPN server 120 and may communicate with the VPN server 120 over a network (e.g., network 122). The VPN server 120 may receive, for example, communication data associated with the user device 102 from the router 220, as discussed elsewhere herein. To receive the communication data, the VPN server 120 may utilize a first exit IP address. The network monitoring device 230 may communicate messages (e.g., sampled data) and/or route update requests with the router 220 and may communicate notifications with the VPN server 120. The messages may be communicated using an sFlow protocol and the route update requests may be communicated using a border gateway protocol (BGP). The notifications may be communicated via HTTP, HTTPS, QUIC, SNMP, or another suitable protocol, as discussed elsewhere herein.

As shown by reference numeral 310, the router 220 may transmit, and the network monitoring device 230 may receive, a message (e.g., sFlow message) indicating a sampled burst amount of data associated with the first exit IP address, as discussed above with respect to FIG. 2. Based at least in part on receiving the message, the network monitoring device 230 may determine that the sampled burst amount of data satisfies the data threshold (e.g., the burst amount of data is larger than the data threshold) associated with the first exit IP address, as discussed above with respect to FIG. 2. Based at least in part on such a determination, as shown by reference numeral 320, the network monitoring device 230 may transmit, and the router 220 may receive, a route update request (e.g., a BGP request) associated with null-routing the first exit IP address, as discussed above with respect to FIG. 2. In some aspects, the BGP request is to be routed to associated ISPs, as discussed above with respect to FIG. 2. Substantially simultaneously, the network monitoring device 230 may transmit, and the VPN server 120 may receive, a notification indicating that the data burst, which satisfies the data threshold associated with the first exit IP address has been received (e.g., network event) to be routed to the first exit IP address and/or that the first exit IP address has been null-routed, as discussed above with respect to FIG. 2. Based at least in part on receiving the notification, as shown by reference numeral 330, the VPN server 120 may deactivate the first exit IP address and may activate a second exit IP address, as discussed above with respect to FIG. 2.

As shown by reference numeral 340, the network monitoring device 230 may transmit, and the router 220 may receive, another BGP request to the router 220 to end the null-routing of the data to be transmitted to the first exit IP address, as discussed above with respect to FIG. 2. Based at least in part on transmitting another BGP request, as shown by reference numeral 350, the router 220 may transmit, and the network monitoring device 230 may receive, another message (e.g., sFlow message) indicating, for example, that the communication data associated with the first exit IP address continues to satisfy the data threshold, as discussed above with respect to FIG. 2. In this case, the network monitoring device 230 may restart the null timer. Alternatively, based at least in part on transmitting another BGP request, the router 220 may transmit, and the network monitoring device 230 may receive, another message (e.g., sFlow message) indicating, for example, that the communication data associated with the first exit IP address fails to satisfy the data threshold. In this case, as shown by reference numeral 360, the network monitoring device 230 may transmit, and the VPN server 120 may receive, another notification (optional) indicating that the communication data, which fails to satisfy the data threshold has been received to be routed to the first exit IP address and/or that the null-routing of the first exit IP address has ended. Based at least in part on receiving such notification, as shown by reference numeral 370, the VPN server 120 may reactivate the first exit IP address and deactivate the second exit IP address, as discussed above with respect to FIG. 2.

As indicated above, FIG. 3 is provided as an example. Other examples may differ from what is described with regard to FIG. 3.

FIG. 4 is an illustration of an example process 400 associated with reassigning exit IP addresses in a VPN, according to various aspects of the present disclosure. In some aspects, the process 400 may be performed by a memory (e.g., memory 730) and a processor (e.g., processor 720) associated with a VPN server (e.g., VPN server 120). As shown by reference numeral 410, process 400 includes activating a first exit IP address for communicating data associated with a user device having an established VPN connection. For instance, the VPN server may utilize an associated processor/controller (e.g., processor 720) to activate a first exit IP address for communicating data associated with a user device having an established VPN connection, as discussed elsewhere herein.

As shown by reference numeral 420, process 400 includes deactivating, during the established VPN connection, the first exit IP address based at least in part on determining that an amount of data communication associated with the first exit IP address satisfies a data threshold. For instance, the VPN server may utilize the associated memory and processor to deactivate, during the established VPN connection, the first exit IP address based at least in part on determining that an amount of data communication associated with the first exit IP address satisfies a data threshold, as discussed elsewhere herein.

As shown by reference numeral 430, process 400 includes activating, during the established VPN connection, a second exit IP address, different from the first exit IP address, for communicating data associated with the user device based at least in part on deactivating the first exit IP address. For instance, the VPN server may utilize the associated memory and processor to activate, during the established VPN connection, a second exit IP address, different from the first exit IP address, for communicating data associated with the user device based at least in part on deactivating the first exit IP address.

Process 400 may include additional aspects, such as any single aspect or any combination of aspects described below and/or in connection with one or more other processes described elsewhere herein.

In a first aspect, wherein process 400 includes reactivating the first exit IP address based at least in part on determining that the amount of data communication associated with the first exit IP address fails to satisfy the data threshold. In some aspects, the second exit IP address may be unselected from being used to communicate data associated with the user device based at least in part on reactivating the first exit IP address.

In a second aspect, alone or in combination with the first aspect, wherein, in process 400, determining that the amount of data communication associated with the first exit IP address satisfies the data threshold includes receiving a notification that indicates that the amount of data communication associated with the first exit IP address satisfies the data threshold.

In a third aspect, alone or in combination with the first through second aspects, wherein, in process 400, determining that the amount of data communication associated with the first exit IP address satisfies the data threshold includes receiving, at the first exit IP address, a notification that indicates that the amount of data communication associated with the first exit IP address satisfies the data threshold.

In a fourth aspect, alone or in combination with the first through third aspects, wherein, in process 400, determining that the amount of data communication associated with the first exit IP address satisfies the data threshold includes receiving, via a hypertext transfer protocol (HTTP) message, a notification that indicates that the amount of data communication associated with the first exit IP address satisfies the data threshold.

In a fifth aspect, alone or in combination with the first through fourth aspects, wherein, in process 400, deactivating the first exit IP address includes deactivating the first exit IP address for a given duration of time.

In a sixth aspect, alone or in combination with the first through fifth aspects, wherein, in process 400, deactivating the first exit IP address includes extending deactivation of the first exit IP address based at least in part on determining, after a given duration of time, that the amount of data communication associated with the first exit IP address continues to satisfy the data threshold.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with reassigning exit IP addresses in a VPN, according to various aspects of the present disclosure. In some aspects, the process 500 may be performed by a memory (e.g., memory 730) and a processor (e.g., processor 720) associated with a VPN server (e.g., VPN server 120). As shown by reference numeral 510, process 500 includes selecting a first exit IP address for communicating data associated with a user device having an established VPN connection. For instance, the VPN server may utilize the associated memory and processor to select a first exit IP address for communicating data associated with a user device having an established VPN connection, as discussed elsewhere herein.

As shown by reference numeral 520, process 500 includes receiving a notification that indicates occurrence of a network event associated with the first exit IP address. For instance, the VPN server may utilize an associated communication interface (e.g., communication interface 770) along with the associated memory and processor to receive a notification that indicates occurrence of a network event associated with the first exit IP address, as discussed elsewhere herein.

As shown by reference numeral 530, process 500 includes communicating, during the established VPN connection, data associated with the user device using a second exit IP address, different from the first exit IP address. For instance, the VPN server may utilize the associated communication interface and the associated memory and processor to communicate (e.g., transmit and/or receive), during the established VPN connection, data associated with the user device using a second exit IP address, different from the first exit IP address, as discussed elsewhere herein.

Process 500 may include additional aspects, such as any single aspect or any combination of aspects described below and/or in connection with one or more other processes described elsewhere herein.

In a first aspect, wherein process 500 includes deactivating the first exit IP address for a given duration of time based at least in part on receiving the notification.

In a second aspect, alone or in combination with the first aspect, process 500 includes deactivating the first exit IP address for a given duration of time based at least in part on receiving the notification; and reactivating the first exit IP address at an expiration of the given duration of time or extending deactivation of the first exit IP address based at least in part on receiving another notification prior to the expiration of the given duration of time.

In a third aspect, alone or in combination with the first through second aspects, process 500 includes deactivating the first exit IP address based at least in part on receiving the notification that indicates occurrence of an amount of data communication associated with the first exit IP address satisfying a data threshold, and reactivating the first exit IP address based at least in part on receiving another notification that indicates occurrence of the amount of data communication associated with the first exit IP address failing to satisfy the data threshold.

In a fourth aspect, alone or in combination with the first through third aspects, in process 500, receiving the notification includes receiving the notification that indicates communication of an amount of data communication associated with the first exit IP address satisfying a data threshold.

In a fifth aspect, alone or in combination with the first through fourth aspects, in process 500, receiving the notification includes receiving the notification at a port associated with the first exit IP address.

In a sixth aspect, alone or in combination with the first through fifth aspects, in process 500, receiving the notification includes receiving the notification via a hypertext transfer protocol (HTTP) message.

In a sixth aspect, alone or in combination with the first through fifth aspects, process 500 includes selecting, during the established VPN connection, the second exit IP address for communicating data associated with the user device based at least in part on receiving the notification.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with reassigning exit IP addresses in a VPN, according to various aspects of the present disclosure. In some aspects, the process 600 may be performed by a memory (e.g., memory 730) and a processor (e.g., processor 720) associated with a VPN server (e.g., VPN server 120). As shown by reference numeral 610, process 600 includes receiving a message indicating an amount of communication data associated with a first exit IP address. For instance, the VPN server may utilize an associated communication interface (e.g., communication interface 770) along with the memory and processor to receive a message indicating an amount of communication data associated with a first exit IP address, as discussed elsewhere herein.

As shown by reference numeral 620, process 600 includes determining that the amount of communication data satisfies a data threshold associated with the first exit IP address. For instance, the VPN server may utilize the associated memory and processor to determine that the amount of communication data satisfies a data threshold associated with the first exit IP address, as discussed elsewhere herein.

As shown by reference numeral 630, process 600 includes transmitting, based at least in part on the determining, a notification indicating that the amount of communication data satisfies the data threshold. For instance, the VPN server may utilize an associated communication interface (e.g., communication interface 770) along with the associated memory and processor to transmit, based at least in part on the determining, a notification indicating that the amount of communication data satisfies the data threshold, as discussed elsewhere herein.

Process 600 may include additional aspects, such as any single aspect or any combination of aspects described below and/or in connection with one or more other processes described elsewhere herein.

In a first aspect, process 600 includes transmitting, via a border gateway protocol to a source of the communication data, a request to suspend communication of data associated with the first exit IP address.

In a second aspect, alone or in combination with the first aspect, in process 600, receiving the message includes receiving the message via an sflow protocol.

In a third aspect, alone or in combination with the first through second aspects, in process 600, transmitting the notification includes transmitting the notification via a hypertext transfer protocol (HTTP).

In a fourth aspect, alone or in combination with the first through third aspects, in process 600, transmitting the notification includes transmitting the notification to indicate that data communication utilizing the first exit IP address is to be suspended.

In a fifth aspect, alone or in combination with the first through fourth aspects, in process 600, determining that the amount of communication data satisfies the data threshold includes comparing the amount of communication data with a threshold amount of data associated with the first exit IP address.

In a sixth aspect, alone or in combination with the first through fifth aspects, process 600 includes receiving the message includes receiving the message from a switch configured to route the communication data to the first exit IP address; and transmitting the notification includes transmitting the notification to a VPN server associated with the first exit IP address.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, devices or the like described elsewhere herein (e.g., VPN server, IP address rotating device, encryption device, etc.). The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   assigning, by a virtual private network (VPN) server, a first exit internet protocol (IP) address to communicate data associated with a user device having an established VPN connection with the VPN server;
   determining, by the VPN server, occurrence of a network event associated with the first exit IP address; and
   assigning, by the VPN server based at least in part on determining occurrence of the network event, a second exit IP address to communicate the data associated with the user device during the established VPN connection, the second exit IP address being different from the first exit IP address.

2. The method of claim 1, wherein determining occurrence of the network event includes determining that an amount of data communication associated with the first exit IP address satisfies a data threshold.

3. The method of claim 1, wherein determining occurrence of the network event includes receiving a notification indicating that an amount of data communication associated with the first exit IP address satisfies a data threshold.

4. The method of claim 1, wherein determining occurrence of the network event includes receiving a notification indicating that an amount of data communication associated with the first exit IP address exceeds a predetermined amount of data communication within a given interval of time.

5. The method of claim 1, further comprising:
   utilizing the first exit IP address or the second exit IP address to communicate the data associated with the user device during the established VPN connection.

6. The method of claim 1, further comprising:
   refraining from utilizing, for a given duration of time and based at least in part on determining occurrence of the network event, the first exit IP address to communicate the data associated with the user device during the established VPN connection.

7. The method of claim 1, further comprising:
   assigning the first exit IP address to communicate the data associated with the user device after an expiration of a given duration of time.

8. A device associated with a virtual private network (VPN) server, the device comprising:
   a memory; and
   a processor communicatively coupled to the memory, the memory and the processor being configured to:
   assign a first exit internet protocol (IP) address to communicate data associated with a user device having an established VPN connection with the VPN server;
   determine occurrence of a network event associated with the first exit IP address; and
   assign, based at least in part on determining occurrence of the network event, a second exit IP address to communicate the data associated with the user device during the established VPN connection, the second exit IP address being different from the first exit IP address.

9. The device of claim 8, wherein, to determine occurrence of the network event, the memory and processor are configured to determine that an amount of data communication associated with the first exit IP address satisfies a data threshold.

10. The device of claim 8, wherein, to determine occurrence of the network event, the memory and processor are configured to receive a notification indicating that an amount of data communication associated with the first exit IP address satisfies a data threshold.

11. The device of claim 8, wherein, to determine occurrence of the network event, the memory and processor are configured to receive a notification indicating that an amount of data communication associated with the first exit IP address exceeds a predetermined amount of data communication within a given interval of time.

12. The device of claim 8, wherein the memory and processor are configured to utilize the first exit IP address or the second exit IP address to communicate the data associated with the user device during the established VPN connection.

13. The device of claim 8, wherein the memory and the processor are configured to refrain from utilizing, for a given duration of time and based at least in part on determining occurrence of the network event, the first exit IP address to communicate the data associated with the user device during the established VPN connection.

14. The device of claim 8, wherein the memory and the processor are configured to assign the first exit IP address to communicate the data associated with the user device after an expiration of a given duration of time.

15. A non-transitory computer-readable medium configured to store instructions, which when executed by a processor associated with a virtual private network (VPN) server, cause the processor to:
   assign a first exit internet protocol (IP) address to communicate data associated with a user device having an established VPN connection with the VPN server;
   determine occurrence of a network event associated with the first exit IP address; and
   assign, based at least in part on determining occurrence of the network event, a second exit IP address to communicate the data associated with the user device during the established VPN connection, the second exit IP address being different from the first exit IP address.

16. The non-transitory computer-readable medium of claim 15, wherein, to determine occurrence of the network event, the processor is configured to determine that an amount of data communication associated with the first exit IP address satisfies a data threshold.

17. The non-transitory computer-readable medium of claim 15, wherein, to determine occurrence of the network event, the processor is configured to receive a notification indicating that an amount of data communication associated with the first exit IP address satisfies a data threshold.

18. The non-transitory computer-readable medium of claim 15, wherein, to determine occurrence of the network event, the processor is configured to receive a notification indicating that an amount of data communication associated with the first exit IP address exceeds a predetermined amount of data communication within a given interval of time.

19. The non-transitory computer-readable medium of claim 15, wherein the processor is configured to utilize the first exit IP address or the second exit IP address to communicate the data associated with the user device during the established VPN connection.

20. The non-transitory computer-readable medium of claim 15, wherein the processor is configured to refrain from utilizing, for a given duration of time and based at least in part on determining occurrence of the network event, the first exit IP address to communicate the data associated with the user device during the established VPN connection.

* * * * *